United States Patent
Mouridsen

(10) Patent No.: US 11,893,854 B2
(45) Date of Patent: Feb. 6, 2024

(54) DETECTION OF POSSIBLE PROBLEM GAMBLING BEHAVIOUR

(71) Applicant: Mindway AI ApS, Aarhus C (DK)

(72) Inventor: Kim Mouridsen, Hjortshøj (DK)

(73) Assignee: MINDWAY AI APS, Aarhus C (DK)

( * ) Notice: Subject to any disclaimer, the term of this patent is extended or adjusted under 35 U.S.C. 154(b) by 267 days.

(21) Appl. No.: 17/048,475

(22) PCT Filed: Apr. 23, 2019

(86) PCT No.: PCT/DK2019/050123
§ 371 (c)(1),
(2) Date: Oct. 16, 2020

(87) PCT Pub. No.: WO2019/201405
PCT Pub. Date: Oct. 24, 2019

(65) Prior Publication Data
US 2022/0028213 A1    Jan. 27, 2022

(30) Foreign Application Priority Data
Apr. 18, 2018  (EP) ..................... 18168088

(51) Int. Cl.
*G07F 17/32* (2006.01)
*G06N 20/00* (2019.01)

(52) U.S. Cl.
CPC ......... *G07F 17/3237* (2013.01); *G06N 20/00* (2019.01)

(58) Field of Classification Search
CPC ............. G07F 17/3237; G07F 17/3239; G07F 17/3241; G06N 20/00
See application file for complete search history.

(56) References Cited

U.S. PATENT DOCUMENTS

| | | | |
|---|---|---|---|
| 8,762,305 B1* | 6/2014 | Chelian | G06N 20/00 706/14 |
| 2003/0176931 A1* | 9/2003 | Pednault | G06K 9/6256 700/44 |
| 2006/0287068 A1 | 12/2006 | Walker et al. | |
| 2007/0259319 A1 | 11/2007 | Stock et al. | |

(Continued)

FOREIGN PATENT DOCUMENTS

| WO | 2005022453 A1 | 3/2005 |
|---|---|---|
| WO | 20080110905 A2 | 9/2008 |

(Continued)

*Primary Examiner* — Jasson H Yoo

(74) *Attorney, Agent, or Firm* — Hamilton, Brook, Smith & Reynolds, P.C.

(57) ABSTRACT

The present disclosure relates to a system and a method for identifying possible problematic behaviour in gambling, in particular online gambling involving monetary transactions. One embodiment relates to a computer implemented method for detection of possible problem gaming behaviour of a subject engaged in one or more 5 games involving monetary transactions, the method comprising the steps of obtaining a dataset comprising the subjects gaining transactions over a time period, analysing the gaining behaviour of said subject by modelling against a trained model employing artificial intelligence, and predicting and/or detecting Possible Problem Gambling Behavior (PPGB) of said subject based on the analysis wherein the trained model is 10 trained based on one or more behavioral targets at outcome.

22 Claims, 2 Drawing Sheets

(56) References Cited

U.S. PATENT DOCUMENTS

| | | | |
|---|---|---|---|
| 2008/0199838 A1* | 8/2008 | Flanagan | G07F 7/0866 |
| | | | 434/236 |
| 2014/0162227 A1* | 6/2014 | Temporin | G07F 17/3237 |
| | | | 434/236 |
| 2015/0141123 A1* | 5/2015 | Callaway | G07F 17/3209 |
| | | | 463/25 |
| 2017/0039807 A1* | 2/2017 | Shigeta | G06Q 50/34 |
| 2017/0169556 A1 | 6/2017 | Lai et al. | |

FOREIGN PATENT DOCUMENTS

| | | |
|---|---|---|
| WO | 2013050841 A1 | 4/2013 |
| WO | 20130170318 A1 | 11/2013 |
| WO | 20160178617 A1 | 11/2016 |

* cited by examiner

DETECTION OF POSSIBLE PROBLEM GAMBLING BEHAVIOUR

RELATED APPLICATIONS

This application is the U.S. National Stage of International Application No. PCT/DK2019/050123, filed Apr. 23, 2019, which designates the U.S., published in English, and claims priority under 35 U.S.C. § 119 or 365(c) to EP Application No. 18168088.5, filed Apr. 18, 2018. The entire teachings of the above applications are incorporated herein by reference.

The present disclosure relates to a system and a method for identifying possible problematic behaviour in gambling, in particular online gambling involving monetary transactions but also normal gambling, like casino gambling, taking place in physical facilities.

BACKGROUND OF INVENTION

Increasing availability of online games carries a risk that more individuals develop problem gambling behavior, either as a primary disorder or as a comorbidity of mental or social problems. To prevent the development of gambling disorders and the ensuing economical and compound social problems much attention has been afforded to general information and prevention programs as well as facilities for voluntary self-exclusion from online platforms. However at-risk individuals may be unsusceptible to general prevention, neglect developing problems or lack the resources to actively impose self-limitations. These concerns are supported by studies suggesting that most gambling disorder sufferers never receive treatment for their gambling problems. Furthermore, monetary limits set by gambling providers as a measure of at-risk behavior, may overlook other aspects of problem gambling, may trigger too late and is likely too simplistic to permit an individualized approach to intervention.

Current approaches to limit negative impacts of gambling include educational material, limit-setting, self-exclusion, self-assessment tests and rule-based procedures defined by operators to identify at-risk individuals.

However, at-risk individuals and problem gamblers may neglect their problem or be unsusceptible to preventive measures rendering educational material, limit-setting and self-exclusion less effective. Similarly, self-assessment tests are biased by each individual's personal conception and interpretation of own behavior. Moreover, it is known that a large fraction of gamblers who ought to self-exclude fail to use this opportunity, whereas a significant fraction of self-excluders are not at actual risk. Finally, systems for automatically identifying at-risk and problem gamblers developed by operators face the challenge that definition of problem gambling is in general difficult and easily become ad-hoc. Non-standardized measures of problem gambling therefore also limits the success of using modern machine-learning and artificial intelligence (AI) based attempts to automate identification, i.e. if the target for an AI algorithm is inadequate the overall value of the algorithm is limited despite seemingly accurate performance.

SUMMARY OF INVENTION

A purpose of the present disclosure is to provide a scalable approach for detection of problematic gambling behavior, in particular an approach which can be computer implemented such that the detection of different types of problematic gambling behavior can be at least partly automated, preferably fully automated, such that changes in online behavior can be rapidly detected, preferably in near real-time.

The present disclosure therefore relates to a (computer implemented) method for detection of possible problem gaming behaviour of a subject engaged in one or more games, for example online games or games and gambling in a casino that often are subject of electronic monitoring and/or control. The games typically involve monetary transactions, the method comprising the step of obtaining a dataset comprising the subject's gaming transactions over a time period.

An optional step is to calculate a set of predefined risk behaviour markers based on said dataset, each risk behaviour marker associated with temporal characteristics of the gaming transactions and/or monetary activity of the gaming transactions. These markers can be used as predictors for training a model.

The gaming behaviour of said subject can then be analysed, e.g. by means of statistical analysis, by modelling the set of risk behaviour markers against a trained model, preferably employing artificial intelligence, and predicting and/or detecting Possible Problem Gambling Behavior (PPGB) of said subject based on the analysis.

However, if for example a neural network is used, predictors might not be necessary, because for a neural network raw or untransformed data may be used directly and only an outcome is typically needed when training the model.

An efficient approach is hereby presented for detecting problem gambling behavior, which can be scaled to near real-time assessment at substantially any online gambling provider or for example in a gambling establishment like a casino, where gambling behavior is often monitored in a similar fashion to detect problematic gambling behavior. The present approach targets the problem of identifying problem gambling by using artificial intelligence to identify problem gambling, which is consistent with human expert assessment. This is in contrast to the hitherto known approach of relying on simple rule-based systems, for example predefining threshold for the volume or intensity of the gambling. This approach also contrasts unsupervised AI methods, AI-based outlier-detection as well as methods using either self-exclusion or questionnaire-based targets. The present approach has demonstrated excellent agreement with manual expert assessment, and it is shown that the presently disclosed approach is capable of detecting a range of problem gambling patterns consistent with reports by problem gamblers in clinics. It is anticipated that the present approach may enable early detection of PPGB and that the differentiated output may lead to an individualized approach to intervention from early detection to brief intervention and treatment referral to professional clinics.

The present disclosure also relates to a system for detection of possible problem gaming behaviour of a subject engaged in one or more games, comprising a computer-readable storage device for storing instructions that, when executed by a processor, performs the method disclosed herein.

The presently disclosed method may be implemented as a separate computer program but may also be implemented as a plugin to an existing service running on a device or online. The method may also be integrated in a network security system.

The present disclosure therefore also relates to a computer program having instructions which when executed by a computing device or system causes the computing device or system to perform the detection of possible problem gaming behaviour according as disclosed herein. Computer program in this context shall be construed broadly and include e.g. programs to be run on a PC or software designed to run on smartphones, tablet computers or other mobile devices. Computer programs and mobile applications include software that is free and software that has to be bought, and also include software that is distributed over distribution software platforms or running on a server.

DESCRIPTION OF DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
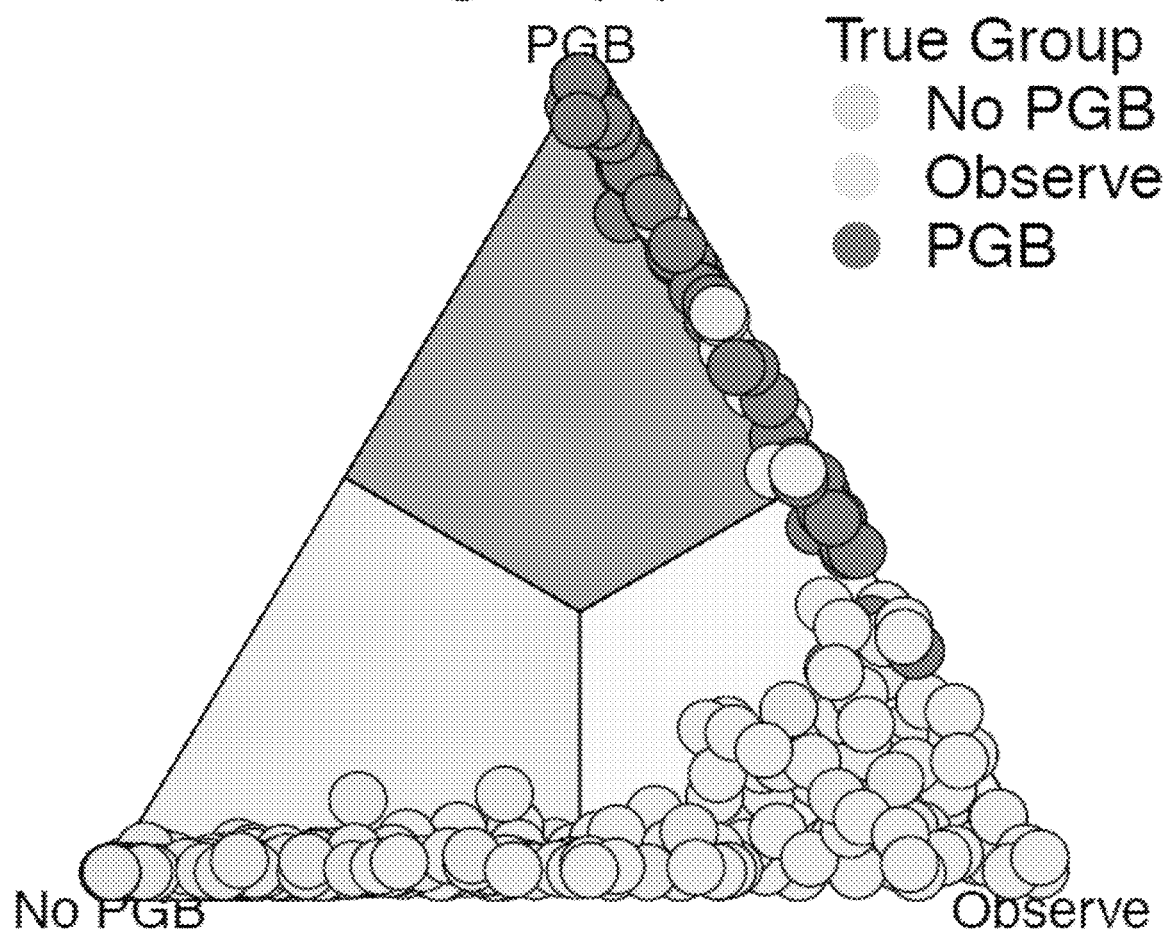
FIG. 1 illustrates the predicted group probabilities in a ternary plot.

In one embodiment the outcome is that subject is labelled as 1) No Problem Gambling Behavior (NPGB), 2) Observe or (3) Possible Problem Gambling Behavior (PPGB) based on the statistical analysis.

The statistical analysis may be a regression analysis performing variable selection and regularization, such as LASSO (least absolute shrinkage and selection operator). In statistics and machine learning, LASSO is a regression analysis method that performs both variable selection and regularization in order to enhance the prediction accuracy and interpretability of the statistical model it produces. Alternatively the statistical analysis may be a regression analysis involving stepwise selection. Preferably the statistical analysis involves machine learning to enhance prediction and detection accuracy. As another alternative the analysis may involve fitting of a neural network, such as a recurrent neural network, or a network based on convolutions. The analysis may also involve transformation of input data for a subject into for example an embedding space for further analysis.

A gaming transaction typically comprises information selected from the group of date, time, type of game, transacted monetary amount, and monetary amount won/lost. The games may be online games or land-based/physical games taking place in a physical facility, such as a casino, the games selected from the group of sports-betting, casino games, scratch cards, cards and lottery. As online games are electronic and "virtual" in their nature, data collection and monitoring is natural. However, it is also becoming more common to survey and monitor gamblers in land-based/physical facilities, such as a casino, e.g. by means of cameras, electronic gambling tables, etc.

In one embodiment of the presently disclosed approach the risk behaviour markers are the key aspect of the model. They can typically be created from the gaming transaction data. The risk behaviour markers are preferably selected from the group of: Number of playing dates, Games per day, Number of breaks (at least one day between gaming), Number of 'runs' (>7 days consecutive playing), Number of different games, Sum of prior game risk assessments, Total number of games, Total win/loss, Win/loss per game, average win/loss per game, Total betted amount, Total win/loss adjusted for largest win, and volatility of wins and losses (how fast money has been won and lost).

It is known that players with a propensity for games often reported by problem gamblers may be differentiated from other customers with an equal gaming volume. This can be provided by pre-assessment of the games and categorization of each game into a (predefined) risk level. Pre-assessment can be provided by an expert, e.g. a psychologist, or using automatic or semi-automatic game risk assessment methods, e.g. based on rules and/or algorithms.

It is known that some type of games can lead to faster addictive behaviour, e.g. games with a rapid play frequency are generally considered more risky. Hence, in order to further improve the model, each type of game can be associated with a predefined risk category. This can for example be assessed by a psychologist. The subjects with a propensity for games often reported by problem gamblers may be differentiated from subjects with an equal gaming volume. I.e. the type of game can be part of the statistical analysis and model prediction.

The actual risk level for a given subject likely pertains to several combinations of risk behavior markers. Predefined second-order interactions between risk behaviour markers may therefore advantageously be included in the model. For instance, the number of playing dates may modulate the risk level in combination with total betted amount, and high average loss and number of different games may together elevate the risk score. The statistical model may therefore include at least 25 risk behaviour markers, preferably at least 50 risk behaviour markers, more preferably at least 75 risk behaviour markers, most preferably at least 77 risk behaviour markers. I.e. the profile for a single subject may therefore as much as 77 unique risk behavior features.

The risk level for a given subject can also be based on automatically established features such as implicitly generated features using kernel methods or explicitly generated using for instance neural networks.

The presently disclosed method may be performed in real-time or substantially or near real-time such that detection of PPGB of subjects involved in gaming can be provided in real-time or near real-time such that addictive gambling and/or compulsive gambling can be detected at an early stage and thereby prevented. The time period involved may be at least one week, at least one month, at least three months or at least six months, such as the last week, the last month, the last three months or the last six months of gaming transactions.

A key aspect of the present disclosure is the trained model. The model can advantageously be trained by employing artificial intelligence (AI), e.g. using machine learning, classifier based learning, supervised learning, deep learning, reinforcement learning, weak learning/weak supervision/weak supervised learning, neural network, recurrent neural network, or any combination thereof.

The model is typically trained with one or more predictors as input and an outcome as target/output. In one preferred embodiment the trained model is trained with the set of risk behavior markers described herein as predictor. Naturally the type of games and/or predefined and/or all second-order interactions between said risk behaviour markers may be included as predictors.

However, if for example a (recurrent or convolutional-based) neural network and/or deep learning is used in the training of the model, the unlabeled raw data can be used as input, i.e. without pre-defined predictors, as long as there is an outcome for the training.

The outcome of the training (i.e. labelling of data) can for example originate from domain expertise, such as expert risk behavior assessment.

Another example of outcome that can be used in the model training is to use data from self-tests, in particular game based self-test as explained in further detail below. E.g. using cognitive and/or behavioral characteristics for self-tested gamblers as outcome, i.e. cognitive and/or behavioral characteristics inferred from behavior on a predefined game, e.g. a game that has been designed such that cognitive and/or behavioral characteristics of gamblers engaging in that game can be inferred directly by means of computational methods.

Outcomes generated with domain expertise as well as outcomes originating from self-test data can lead to extremely powerful models and generate very precise results. One issue with both approaches is to create sufficiently large labeled datasets for the model training.

Labelling of data to generate outcome for the model training may include labelling series of gaming transactions, for example from a plurality of subjects ranging from No Problem Gambling Behavior (NPGB) to) Possible Problem Gambling Behavior (PPGB), e.g. as one of (1) No Problem Gambling Behavior (NPGB), (2) Observe or (3) Possible Problem Gambling Behavior (PPGB). Said series of gaming transactions may extend over a time period of at least one week, preferably at least one month, more preferably at least three months. Series of gaming transactions may include at least 500 series of gaming transactions from different subjects, preferably at least 1000 series, more preferably at least 2000 series, most preferably at least 2500 series of gaming transactions from different subjects.

When applying domain expertise, e.g. expert risk behavior assessment, labeling can be provided manually by a psychologist, preferably a psychologist experienced with identifying addictive gambling and/or compulsive gambling behavior.

In order to enhance prediction accuracy the expert risk behavior assessment comprises analyzing at least 500 series of gaming transactions from different subjects, preferably at least 1000 series, more preferably at least 2000 series, most preferably at least 2500 series of gaming transactions from different subjects.

The presently disclosed approach of applying AI to analysis of raw data replaces the typical prior art rule based approach because the model training can be based on state of the art neuroscience and clinical psychology, i.e. the experts' knowledge. The presently disclosed artificial intelligence approach may thereby rely on human expert evaluations of hundreds or thousands of gaming trajectories. In one example a board of clinicians and pathological gambling researchers have meticulously analyzed a large volume (>1000) of actual online gambling trajectories, thereby considering the compound gaming behavior over hundreds of thousands of single bets. Applying their neuroscientific and clinical expertise, the associated experts have scrutinized the underlying gambling behaviors for any signs of manifest or developing risky or compulsive practice. The result is an 'analogue' completely objective assessment of individual gambler behavior which factors into evaluation of the complex interplays between behavioral characteristics as experienced practitioners are able to synthesize into a risk score. The artificial intelligence approach presented herein can then be used to 'digitize' the evaluation process. A fast AI approach to detect problem gambling can thereby be provided which have been demonstrated to evaluate online behavior just like the experts, with accuracy close to 90%.

The presently disclosed approach to detect problem gambling may be implemented to run near to real time.

In one embodiment the model is trained with an elastic net where the mixing parameter was fixed with a predefined weight of e.g. 0.95 for L1 loss (Lasso penalty) and e.g. 0.05 for L2 loss (ridge penalty). Said penalties can be configured such as to promote generalizability of the model by protecting against overfitting. The balance between model fit and regularization can be modified by a parameter which is determined by cross validation.

Self-Assessment

Self-assessment of problem gambling behavior is widely used as a means to have gamblers assessing their own risk of engaging in problem gambling behavior. Prior art approaches often rely on questionnaires to individual gambler about the perceived individual's control and impact of gambling. This clearly carries a risk of bias, especially for actual problem gamblers.

A further embodiment of the presently disclosed approach utilizes gamification of self-assessment, i.e. one or more game based self-tests, where individual gamblers are invited to engage in one or more conceptually easy, yet highly controlled games which allows for systematic observation of each participating individual, for example their working memory, visual processing, attentional aspects, actual decision-making and/or identification of risk, while at the same time the self-assessment games are more engaging than traditional questionnaire-based tests.

The gamification of the self-test provides insight in gambler's own beliefs, for example about gaming habits and decision-making. For problem gamblers in particular 'normal' self-tests based on questionnaires are likely biased and unengaging and very few problem gamblers are likely to take the test. In the presently disclosed approach the self-test is preferably casted as one or more short and highly designed games, e.g. based on empirical knowledge on how to assess decision making or attentional aspects in participants, e.g. like the Iowa gambling task. When a specifically designed self-test is completed by a subject, a scientific model can then be used to translate gaming action sequences into behavioral parameters, for example by using neurobiological and cognitive results.

One self-test game of the presently disclosed approach can for example be designed to promote actual decision making of the gambler taking the test. The advantage is that it is during actual decision-making that problem gambling becomes apparent and can be analyzed. Examples of games promoting and revealing decision making are the Iowa gambling task and the Game of Dice Task, which can be used herein.

Another self-test game of the presently disclosed approach can for example be designed to promote and reveal attentional aspects of the gambler taking the test. One example is the Stroop test design to measure the Stroop effect. It is for example known that problem gamblers may have difficulties concentrating on a specific task and the Stroop test can provide a measure thereof.

Another self-test game of the presently disclosed approach can for example be designed to promote and reveal one or more of strategic planning, organized searching, utilizing environmental feedback to shift cognitive sets, directing behavior toward achieving a goal, and modulating impulsive responding of the gambler taking the test. One example is the Wisconsin Card Sorting Test (WCST), which relies upon a number of cognitive functions including attention, working memory, and visual processing.

Another advantage of a gamified self-test is that the information gathered from individuals taking the gamified self-test, can be used to synthesize the behavioral parameters based on the same individuals' historic gambling data from normal gambling. Using AI as described above it is possible to create behavioral characteristics for all the individuals/gamblers, also individuals that have not participated in the gamified self-test. And based on these behavioral characteristics for gamblers that have not participated in the self-test(s) it may be possible to identify gamblers that categorize (2) Observe or (3) Possible Problem Gambling Behavior (PPGB) and optionally urge or encourage these gamblers to take the self-test to more specifically analyze their actual decision making based on test results and synthesize their behavioral parameters.

Weak Supervision

The basic idea behind weak supervision is to allow users/experts to provide supervision at a higher level than case-by-case labeling, and then to use various statistical techniques, e.g. to deal with the possibly noisier labels. I.e. weak supervision is about leveraging higher-level and/or noisier input from subject matter experts/domain experts.

Domain experts can also be used in this case, but when applied at a higher level, it can be much less time consuming. It has surprisingly been found that by getting large volumes of lower-quality supervision in this way, higher-quality models can be trained at a fraction of the time spent by domain experts. This can for example be provided by employing the Snorkel framework: snorkel.stanford.edu The purpose of weak supervision is the same as in the "normal" supervised setting, but instead of a ground-truth labeled training set labeled by expert, we have:

Unlabeled data

One or more weak supervision sources provided by a human subject matter expert/domain expert, such that each one supervision source has:

A coverage set which is the set of points over which it is defined

An accuracy, defined as the expected probability of the true label over its coverage set, which is assumed to be <1.0.

These weak label distributions serve as a way for human expert supervision to be provided more cheaply and efficiently: either by providing higher-level, less precise supervision, such as heuristic rules or expected label distributions, cheaper, lower-quality supervision, such as crowdsourcing, or taking opportunistic advantage of existing resources, such as knowledge bases, or pre-trained models. These weak label distributions could thus take one of many well-explored forms:

Weak Labels: The weak label distributions could be deterministic functions. E.g. a set of noisy labels for each data point. These could come from crowd workers, be the output of heuristic rules, whereon an external knowledge base is heuristically mapped. These could also be the output of other classifiers which only yield MAP estimates, or which are combined with heuristic rules to output discrete labels.

Constraints: Constraints can also be represented as weak label distributions, for example constraints on execution of logical forms, which encode various forms of domain expertise and/or cheaper supervision from e.g. lay annotators.

Distributions: A probability distribution may be used. For example, one or more weak (i.e. low accuracy/coverage) or biased classifiers, such as classifiers trained on different data distributions as in the transfer learning setting. Or one or more user-provided label or feature expectations or measurements.

Weak labels in the form of heuristic rules could in this case for example be experts providing various thresholds for one or more of the eleven base markers (risk behavior markers) for gambling activity listed herein. E.g. one expert could provide one heuristic rule as if total win/loss exceeds a certain amount within a given time period, the gambler should be characterized problem gambler. Another expert might assess the same heuristic rule at another threshold value. A third expert might assess the same heuristic rule at a third threshold value. These three values for one heuristic rule, provide three weak labels that can be used in the weak supervised model training. Supplementing with a plurality of additional weak labels, constraints and/or distributions, e.g. from domain experts, the model can be trained efficiently using weak supervised learning, without relying on experts to assess a large dataset in detail.

Predictive Analysis

One of the advantages of online gambling is that for some gamblers a large amount of gambling data acquired over a long period of time, possibly more than one year, can be available. This can be utilized for very early predictive identification of problem gambling behavior.

In one embodiment the behavioral targets are inferred from a dataset wherein the time period of the gaming transactions corresponds to or is prior in time than the time period of the gaming transactions in the dataset of the trained model.

However, for predictive analysis the behavioral targets can be inferred from a dataset wherein the time period of the gaming transactions are later in time than the time period of the gaming transactions in the dataset of the trained model, preferably at least 3 months, or at least 6 months, or at least 9 months, most preferably at least 12 months later in time.

In one embodiment only the most recent gambling data in a dataset is labelled by experts, e.g. data from the last one, two or preferably three months. This labelled dataset, where each gambler has been assessed by an expert and categorized in one of the three categories listed herein, can then be used as outcome for training a model based on earlier data in the same dataset, e.g. data which is at least 3 months, or at least 6 or at least 9, preferably at least 12 months earlier. E.g. a dataset may include data acquired over a time period of 12 months. The data for months 10-12 is labelled by experts, and used as outcome to train a model based on data for months 1-3, i.e. data acquired at least 6 months earlier than what has been assessed by experts. This may lead to the discovery of early predictors for problem gambling behavior, predictors that are not even visible or known to the experts, thereby significantly improving the model.

Example

Data

Anonymized online gambling data for 2.431 randomly selected customers with an account at an online game service provider covering the period from 19 Dec. 2011 to 1 Feb. 2014. The dataset contains a record for each transaction in the period consisting of date, time, game and monetary amount bet and won/lost. There were 28 different online games including sports-betting, casino games, online scratch cards, cards and lottery games. Aiming to develop a model capable of rapidly identifying changes in gaming behavior, periods of 3 months were randomly selected for each customer (subject) as the basis for expert assessment of risk level.

Expert Assessment

Data for individual subjects were manually reviewed and assessed for possible problem gambling behavior by a psychologist who has extensive experience in clinical aspects and decision-making problems of gambling disorder. The basis for the assessment was a representation of the complete gambling data for each individual. In the manual assessment particular attention was given to ranking of games (high vs. low risk games), play frequency, number of games played, magnitude of losses and volatility of gains and losses (how fast money was won and lost). Each individual was labeled one of (1) No Problem Gambling Behavior (NPGB), (2) Observe or (3) Possible Problem Gambling Behavior (PPGB). The intermediary group 'Observe' represents subjects where problem gambling behavior is not manifest, but some elements of risk behavior were identified and it is suggested that these subjects are observed more closely over time for development of PPGB.

Model

To facilitate automated detection of PPGB the information from an individual 3-month period is encoded using eleven base markers (risk behavior markers) known to be associated with risk behavior, see Table 1.

TABLE 1

List of data markers

Base Markers
Number of playing dates
Games per day
Number of breaks (at least one day between gaming)
Number of 'runs' (>7 days consecutive playing)
Number of different games
Sum of prior game risk assessments
Total number of games
Total win/loss
Win/loss per game
Total betted amount
Total win/loss adjusted for largest win The base markers characterize temporal characteristics as well as monetary behavior. Additionally each of the 28 different games were pre-assessed by the psychologist and assigned a prior risk category, such that players with a propensity for games often reported by problem gamblers may be differentiated from other customers with an equal gaming volume. Games with a rapid play frequency were generally considered more risky. The actual risk level for a given subject likely pertains to several combinations of base markers, and therefore additionally all second-order interactions were considered. For instance, the number of playing dates may modulate the risk level in combination with total betted amount, and high average loss and number of different games may together elevate the risk score. The profile for a single subject therefore consists of 77 unique features.

An elastic net was trained with the 77-value profile as predictor and expert risk behavior assessment as outcome. The elastic net mixing parameter was fixed with a weight of 0.95 for L1 loss (Lasso penalty) and 0.05 for L2 loss (ridge penalty). The penalties promote generalizability of the model by protecting against overfitting. The balance between model fit and regularization was modified by a parameter (lambda) which value was determined by cross validation.

Below the performance of the model is quantified relative to the expert assessments and illustrate its feasibility in detecting changes in gambling behavior by iteratively applying it to three-month periods during the two-year observational period in steps of one week.

Results

Performance of the fitted model relative to expert assessment is summarized in Table 2 below.

TABLE 2

| | | Expert Assessment | | |
| --- | --- | --- | --- | --- |
| | | NPGB % | Obs % | PPGB % |
| Spilscanner | NPGB % | 1738% | 43% | 2% |
| | Obs % | 20% | 91% | 8% |
| | PPGB % | 1% | 5% | 76% |

The sensitivity of the algorithm in detecting PPGB is 88% and the specificity in detecting NPGB is 99%. In total 98% of the manually identified PPGB cases are identified by the algorithm as abnormal, i.e. predicted as either in the Observe or PGB group. Conversely, when the algorithm predicts PPGB there is 93% probability the case was indeed manually assessed as PPGB. A prediction of NPGB has a 97% probability of being matched by the expert assessment. The overall accuracy of the model is 96%.

FIG. 1 illustrates the predicted group probabilities in a ternary plot. Each point represents a subject with the color corresponding to the expert assessment and the position in the triangle representing the predicted group. The figure confirms that the NPGB and PPGB groups are well identified with a degree of 'spill-over' at the boundaries to the Observe group The presently disclosed approach can also be applied to longer periods, for example applied consecutively in three-month windows in intervals of one week. In one example of one subject an apparent high activity could be observed on multiple games, however the activity include low-intensity lottery and there was little indication of impulsivity in the behavior. In another example of another subject a long period of apparently controlled behavior could be observed while towards the end of the period the behavior transitions to higher intensity and gradually larger losses. This could be detected rapidly by the presently disclosed approach.

Figure 2:
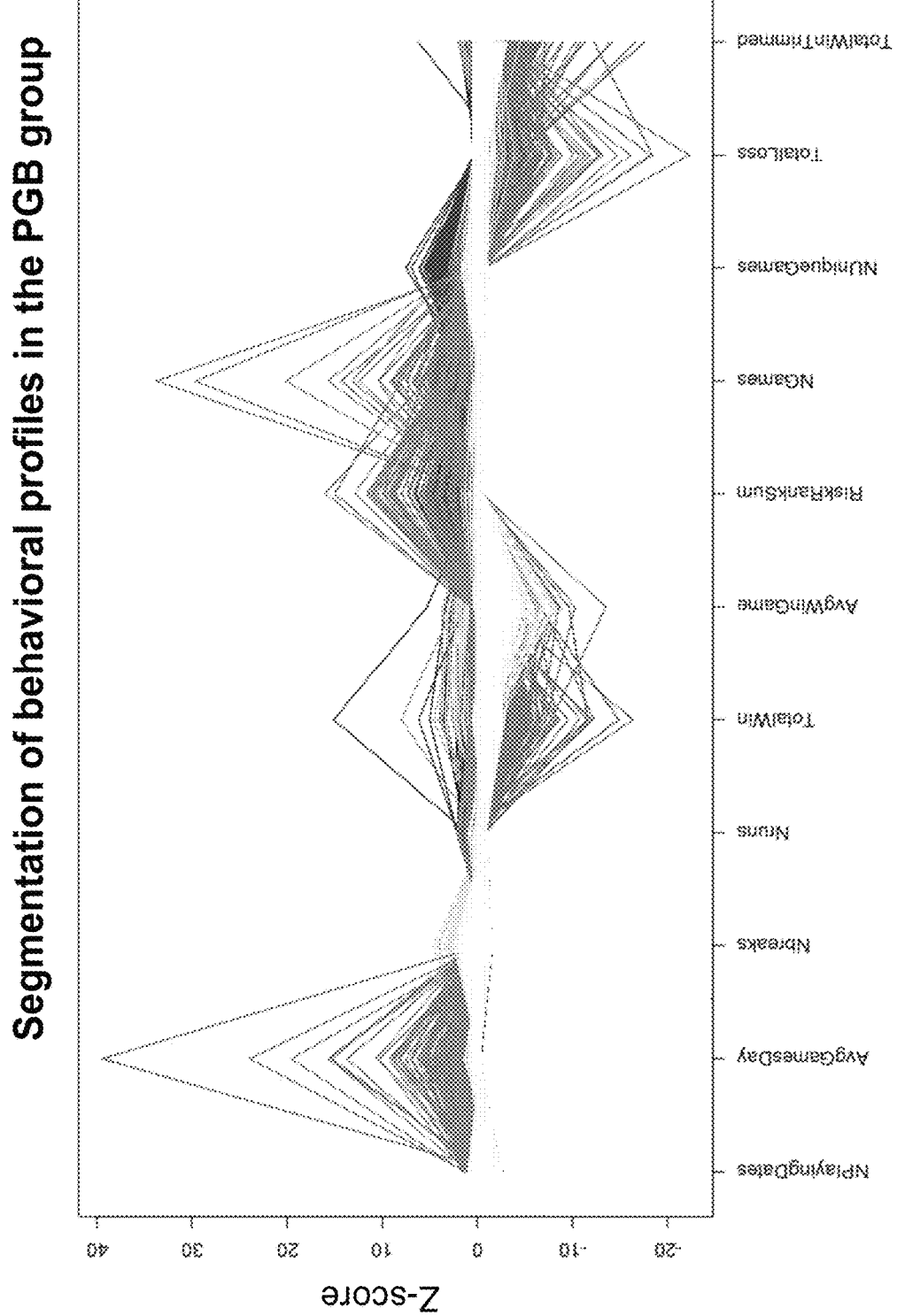
FIG. 2 confirms that the presently disclosed approach detects a variety of behaviors with characteristics shared by typical clinical profiles such as high intensity and possible loss-chasing (purple), high risk-seeking (red) and high impulsivity/diversity in game selection (blue).

To further validate the capability of the algorithm to identify different behavioral patterns a cluster analysis was performed of the high-risk group across the base markers. FIG. 2 confirms that the algorithm detects a variety of behaviors with characteristics shared by typical clinical profiles such as high intensity and possible loss-chasing (purple), high risk-seeking (red) and high impulsivity/diversity in game selection (blue).

It is noted that the algorithm has been scaled to production setting at commercial online game service provider, where a complete analysis can be performed in less than 12 minutes.

The invention claimed is:

1. A computer implemented method for detection of possible problem gaming behaviour of a subject engaged in one or more games involving monetary transactions, the method comprising the steps of:
   obtaining a reference dataset that includes objective markers of gameplay by a plurality of reference subjects over a first time period;
   dividing the reference dataset into a first subset and a second subset, the first subset corresponding to an early portion of the first time period and the second subset corresponding to a later portion of the first time period;

labeling the second subset with results of an expert behaviour assessment of the second subset to generate labels for the second subset;
training a classification model using the first subset and the labels for the second subset;
obtaining a subject dataset comprising the subject's gaming transactions over a second time period,
applying the subject dataset against the classification model; and
detecting Possible Problem Gambling Behaviour (PPGB) of said subject based on an analysis of gaming behaviour output by the classification model.

2. The method according to claim 1, comprising the step of labelling the subject as 1) No Problem Gambling Behaviour (NPGB), 2) Observe or (3) Possible Problem Gambling Behaviour (PPGB) based on the analysis.

3. The method according to claim 1, comprising the steps of calculating a set of predefined risk behaviour markers based on said dataset, each risk behaviour marker associated with temporal characteristics of the gaming transactions and/or monetary activity of the gaming transactions, and analysing the gaming behaviour of said subject by modelling the set of risk behaviour markers against the classification model.

4. The method according to claim 3, wherein the risk behaviour markers are selected from the group of: Number of playing dates, Games per day, Number of breaks (at least one day between gaming), Number of 'runs' (>7 days consecutive playing), Number of different games, Sum of prior game risk assessments, Total number of games, Total win/loss, Win/loss per game, average win/loss per game, Total betted amount, Total win/loss adjusted for largest win, and volatility of wins and losses (how fast money has been won and lost).

5. The method according to claim 3, comprising the step of including predefined and/or all second-order interactions between said risk behaviour markers.

6. The method according to claim 1, wherein the classification model is trained with a set of risk behaviour markers as predictor.

7. The method according to claim 1, wherein the classification model is trained using machine learning, classifier based learning, supervised learning, deep learning, reinforcement learning, weak learning/weak supervision/weak supervised learning, neural network, recurrent neural network, or any combination thereof.

8. The method according to claim 1, wherein the classification model is trained without predictor and with raw data or untransformed data as input.

9. The method according to claim 1, wherein the classification model is trained with an expert risk behaviour assessment as outcome.

10. The method according to claim 1, wherein the classification model is trained by utilizing results of self-assessments or other self-tests of a plurality of subjects.

11. The method according to claim 1, wherein the classification model is trained by utilizing results of self-assessment of subjects, wherein the self-assessment comprises at least one of each participating subject's attentional aspects, actual decision-making, working memory, visual processing and identification of risk.

12. The method according to claim 1, wherein the classification model is trained by utilizing cognitive/behavioural characteristics inferred from a plurality of subjects' behaviour in at least one predefined self-test game.

13. The method according to claim 12, wherein said at least one self-test game is selected from the group of Iowa gambling task, Game of Dice Task, Wisconsin Card Sorting Test and Stroop test.

14. The method according to claim 1, wherein the analysis is a regression analysis performing variable selection and regularization.

15. The method according to claim 1, wherein the analysis is statistical analysis in the form of regression analysis, involving stepwise selection.

16. The method according to claim 1, wherein the subject's gaming transactions comprise information selected from the group of date, time, type of game, transacted monetary amount, and monetary amount won/lost.

17. The method according to claim 1, wherein the games are online games or games taking place in a physical facility, the games selected from the group of sports-betting, casino games, scratch cards, cards and lottery.

18. The method according to claim 1, wherein each of one or more respective types of the one or more games is associated with a predefined risk category and where the type of game is part of the analysis.

19. The method according to claim 1, wherein the method is performed in real-time such that detection of PPGB of subjects involved in gaming can be provided in real-time such that addictive gambling and/or compulsive gambling can be detected at an early stage and thereby prevented.

20. The method according to claim 1, wherein the second time period is at least one week, at least one month, at least three months or at least six months, or the last week, the last month, the last three months or the last six months of gaming transactions.

21. The method according to claim 1, wherein the subject dataset includes at least 25 risk behaviour markers.

22. A system for detection of possible problem gaming behaviour of a subject engaged in one or more games, comprising a computer-readable storage device for storing instructions that, when executed by a processor, cause the system to:
obtain a reference dataset that includes objective markers of gameplay by a plurality of reference subjects over a first time period;
divide the reference dataset into a first subset and a second subset, the first subset corresponding to an early portion of the first time period and the second subset corresponding to a later portion of the first time period;
label the second subset with results of an expert behaviour assessment of the second subset to generate labels for the second subset;
train a classification model using the first subset and the labels for the second subset;
obtain a subject dataset comprising the subject's gaming transactions over a second time period,
apply the subject dataset against the classification model; and
detect Possible Problem Gambling Behaviour (PPGB) of said subject based on an analysis of gaming behaviour output by the classification model.

* * * * *